United States Patent [19]

Berrong et al.

[11] Patent Number: 4,899,983
[45] Date of Patent: Feb. 13, 1990

[54] ANTI-WEDGING PRESSURE SEAL RING APPARATUS

[75] Inventors: David B. Berrong, Oviedo; Thomas L. Schuchart, Casselberry, both of Fla.

[73] Assignee: Westinghouse Electric Corp., Pittsburgh, Pa.

[21] Appl. No.: 298,443

[22] Filed: Jan. 18, 1989

[51] Int. Cl.⁴ .......................... F16K 41/00; F16J 9/00; F16J 15/16
[52] U.S. Cl. ...................... 251/214; 92/172; 271/168; 271/191; 271/216
[58] Field of Search ............... 251/214; 277/168, 170, 277/171, 172, 173, 216, 218; 92/172

[56] References Cited

U.S. PATENT DOCUMENTS

| | | | |
|---|---|---|---|
| 1,963,725 | 6/1934 | Tector | 277/168 |
| 3,554,564 | 1/1971 | Lassanske | 92/172 |
| 3,602,261 | 8/1971 | Brown et al. | |
| 3,831,952 | 8/1974 | Geffroy | 277/216 |
| 3,857,542 | 12/1974 | Heymann | |
| 4,350,352 | 9/1982 | Kolarik | 92/172 |
| 4,679,769 | 7/1987 | Dawawala et al. | |

FOREIGN PATENT DOCUMENTS

| | | | |
|---|---|---|---|
| 287694 | 3/1914 | Fed. Rep. of Germany | 277/168 |
| 731496 | 1/1943 | Fed. Rep. of Germany | 277/168 |
| 3207810 | 9/1982 | Fed. Rep. of Germany | 277/168 |

Primary Examiner—George L. Walton

[57] ABSTRACT

A valve plug having a valve plug housing shaped to fit in a bonnet cylinder of steam control valves has a pressure seal ring groove for holding a pressure seal ring therein. The pressure seal ring groove has a pair of walls and a bottom surface end and antiwedging relief groove formed in one wall of the pressure seal ring groove adjacent the bottom surface thereof to prevent the wedging of a pressure seal ring between a valve plug and a bonnet cylinder bore wall. The pressure seal ring wears a step in the contact surface to allow the wedging which can otherwise prevent the valve from closing as required for turbine overspeed protection. The valve plug housing pressure seal ring groove can be annular groove having an annular pressure seal ring therein and the relief groove can be annular groove formed in one wall of the pressure seal ring groove adjacent the pressure seal ring along the seal ring contact surface of the pressure seal ring. The relief groove has a pair of sidewalls and a bottom surface with one wall forming an extension to the pressure seal ring groove bottom surface so that wear on the pressure seal ring groove wall enlarges the width of the pressure seal groove to prevent a step forming therein and wedging of the pressure seal ring between the valve plug and the bonnet cylinder bore.

4 Claims, 1 Drawing Sheet

ANTI-WEDGING PRESSURE SEAL RING APPARATUS

BACKGROUND OF THE INVENTION

The present invention relates to an improvement in steam turbines and especially to a pressure seal ring anti-wedging relief groove in a throttling valve.

Electric utility power generating systems generally comprise an alternating current electric power generator driven by a turbine. While some systems employ water turbines, most systems utilize steam turbines in which a controlled steam flow through the turbine regulates the rotational velocity of a driven turbine shaft. The steam flow is controlled, in response to electric power demands placed on the generator, such that the frequency of the alternating current produced by the generator is maintained at a constant value regardless of variations in electric power demands placed on the generator. The steam flow in turn is controlled by various flow control valves such as throttling valves and steam bypass valves.

The present invention relates to an improvement in the flow control valves of a steam turbine and especially to a throttling valve. In the past, these valves had a valve plug riding in a bonnet cylinder with the valve plug having one or more pressure seal ring grooves therein. A pressure seal ring can maintain the pressure drop across the ring which results in the pressure seal ring contacting the valve plug. In service, it has been found that the pressure seal ring wears a step in the contact surface along the edge of pressure seal ring groove of the valve plug. The resultant step worn along the edge of the groove can result in a wedging of the pressure seal ring between the valve plug and the bonnet cylinder bore and the resultant inability of the valve to close as required for turbine overspeed protection. The aim of the present invention is to prevent this wedging of the pressure seal ring between the valve plug and the bonnet cylinder bore as the pressure seal wears into the groove wall of the valve plug.

Typical throttling valves and steam bypass valves can be seen in prior U.S. Pats. to Heymann for a Noise Suppressing Throttle Valve, No. 3,857,542, and in the Brown et al. U.S. Pat. No. 3,602,261, for a Steam Turbine Control Valve Structure and in the Dawawala et al. Pat. No. 4,679,769, for a Steam Turbine Control Valve for Cyclical Duty. This latter patent shows an overall configuration of a one-piece bonnet control valve. These patents are all assigned to Westinghouse Electric Corporation.

SUMMARY OF THE INVENTION

A valve plug has a valve plug housing shaped to fit in a bonnet cylinder of a steam control valve of a steam turbine. The valve plug has one or more pressure seal ring grooves for holding pressure seal rings therein. Each pressure seal ring groove in turn is formed of a pair of annular walls and a bottom surface. A relief groove is formed in one wall of the pressure seal ring groove adjacent the bottom surface thereof so that that relief groove will reduce the wedging of the pressure seal ring between the valve plug and the bonnet cylinder bore as the groove wall wears away a step during usage of the valve plug with the pressure seal ring therein. This avoids the wearing of a step formed by the pressure seal ring contacting one wall of the groove which results in a wedging of the pressure seal ring between the valve plug and the bonnet cylinder bore which wedging can result in the inability of the valve to close as required for turbine overspeed protection. There is a pressure drop across the pressure seal ring with a higher pressure on one side of the pressure seal ring and a lower pressure on the other side thereof so that the contact of the pressure seal ring on its low pressure side against the adjacent wall in the groove tends to form a step so that the relief groove is formed in the pressure seal ring groove wall adjacent the pressure seal ring. The relief groove has a pair of sidewalls and a bottom surface and one side wall forms an extension to the pressure seal ring groove bottom surface so that wear on one pressure seal ring groove wall enlarges the width of the pressure seal groove without forming a step and eliminates the wedging of a pressure seal ring therein.

DESCRIPTION OF THE PREFERRED EMBODIMENT

Figure 1:
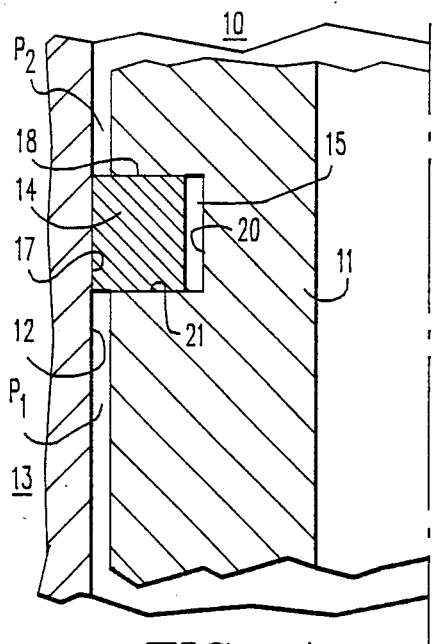
Figure 2:
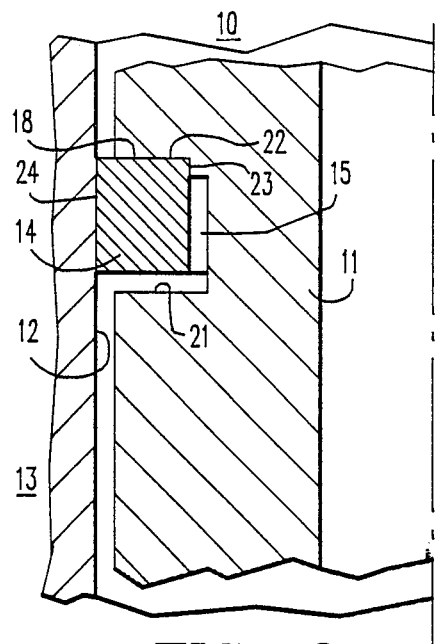

Referring to FIGS. 1 and 2, a portion of a steam turbine steam control valve or bonnet valve 10 in accordance with the prior art is illustrated. This prior art configuration includes a valve plug 11, which is similar to a piston, riding in a bonnet cylinder bore 12 of a bonnet cylinder 13. Pressure ring 14 rides in a groove 15 and slides against the contact surface 17 formed between the one side of the ring 14 and the bonnet cylinder bore wall 12. In normal operation, the pressure in the annular area P1 is the high pressure side and has a higher pressure than the other side P2 of the seal ring 14. The application of this pressure differential drives the seal ring 14 against the wall 18 of the groove 15. The groove 15 also has a bottom 20 and a wall 21.

The pressure differential between P1 and P2 as the valve plug 11 moves back and forth keeps the pressure on the surface 18 of the groove 15. When the step 22 is worn deep enough, as illustrated in FIG. 2, the ring 14 tends to bind between the side of the step 23 of the valve plug and the bonnet cylinder bore wall 12 anywhere along the outside diameter 24 of the ring 30. The resultant step 22 can result in the wedging of the pressure seal as shown and the inability of the valve to close as required for turbine overspeed protection.

Figure 3:
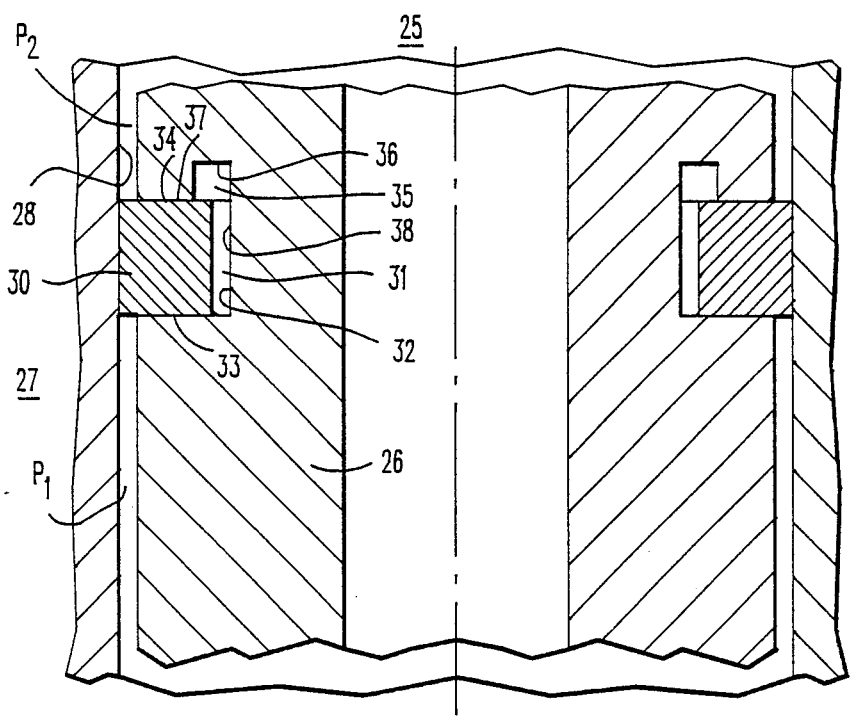

In FIG. 3, a portion of a valve has a valve plug 26 riding in a bonnet cylinder 27 in the bonnet cylinder bore 28 similar to the embodiment in FIG. 1 and having a valve seal ring 30 riding in a ring groove 31 having a bottom 32 and a wall 33. The groove 31 has a wall 34 where the resulting wear can be expected between the ring 30 and the wall 34. A relief groove 35 is located adjacent the bottom 32 of the groove 31 and has a bottom 36, a wall 37, and a second wall 38. The wall 38 tends to form a continuous extension from the bottom wall 32 of the groove 31. The groove 35 is also an annular relief groove adjacent the annular ring groove 31. Thus as the wall 34 wears away, the groove 31 is enlarged by the wearing away of the wall and no step 22, as shown in FIG. 2, is formed in the improvement of FIG. 3 since the relief groove allows the entire wall 34 to wear away enlarging the groove 31. Relief groove wear, at least to the depth of the relief groove, can be tolerated without the associated possibility of wedging in accordance with FIG. 2.

It should be clear at this time that an improvement to steam turbine bonnet valves has been provided in which a relief is incorporated into a standard pressure seal ring groove to reduce the potential of wear and valve plug actuation resulting in wedging of the seal ring between a valve plug and a bonnet cylinder bore. However, the present invention is not to be construed as limited to the forms shown which are to be considered illustrative rather than restrictive.

I claim:

1. A valve plug having a valve plug housing shaped to fit in a bonnet cylinder of a steam control valve of a steam turbine and having a pressure seal ring groove for holding a pressure seal ring therein, said pressure seal ring groove having a pair of walls and a bottom surface, the improvement comprising: a relief groove formed in one wall of said pressure seal ring groove adjacent the bottom surface, the relief groove defining a reduced width wall surface in said one wall to reduce wedging of said pressure seal ring between the valve plug and bonnet cylinder bore as the groove wall wears away at least to the depth of seised relief groove during movement of the valve plug with a pressure seal ring therein.

2. A valve plug in accordance with claim 1 in which said valve plug housing pressure seal ring groove is an annular groove having a pressure seal ring therein and said relief groove is an annular groove formed in said valve plug housing in one wall adjacent to the bottom surface of said pressure seal ring groove.

3. A valve plug in accordance with claim 2 in which the pressure seal ring has a pair of sides, a high pressure side and a low pressure side and said valve plug housing relief groove is in the low pressure seal ring groove wall adjacent the seal ring contact surface.

4. A valve plug in accordance with claim 3 in which said valve plug housing pressure seal ring groove relief groove has a pair of side walls and a bottom surface and one side wall forms an extension to said pressure seal ring groove bottom surface whereby wear on said one pressure seal ring groove wall enlarges the width of the pressure seal groove and reduces the potential for wedging of a pressure seal ring therein.

* * * * *